(12) United States Patent
Mannhardt (10) Patent No.: US 11,054,369 B2
(45) Date of Patent: Jul. 6, 2021

(54) SENSOR SYSTEM AND METHOD FOR THE PROCESS-INTEGRATED OPTICAL ANALYSIS OF BULK CARGO

(71) Applicant: BLUE OCEAN NOVA GMBH, Eschach (DE)

(72) Inventor: Joachim Mannhardt, Aalen (DE)

(73) Assignee: Endress+Hauser Conducta Gesellschaft fuer Mess- und Regeltechnik mbH + Co. KG, Gerlingen (DE)

( * ) Notice: Subject to any disclaimer, the term of this patent is extended or adjusted under 35 U.S.C. 154(b) by 0 days.

(21) Appl. No.: 16/215,062

(22) Filed: Dec. 10, 2018

(65) Prior Publication Data

US 2019/0107494 A1    Apr. 11, 2019

Related U.S. Application Data

(63) Continuation of application No. PCT/EP2017/063487, filed on Jun. 2, 2017.

(30) Foreign Application Priority Data

Jun. 8, 2016    (DE) .......................... 102016110609.7

(51) Int. Cl.
  *G01N 21/85*    (2006.01)
  *A01D 41/127*    (2006.01)
  *G01N 21/03*    (2006.01)

(52) U.S. Cl.
  CPC ......... *G01N 21/85* (2013.01); *A01D 41/1277* (2013.01); *G01N 21/0303* (2013.01);
  (Continued)

(58) Field of Classification Search
  CPC ......... A01D 41/1277; G01N 2021/036; G01N 2021/8592; G01N 21/0303; G01N 21/85
  See application file for complete search history.

(56) References Cited

U.S. PATENT DOCUMENTS 3,652,152 A * 3/1972 Thursby, Jr. ........... G02B 7/004
359/822
4,115,009 A * 9/1978 Zepp ..................... G01N 21/85
356/400

(Continued)

FOREIGN PATENT DOCUMENTS

CN    1906477 A    1/2007
DE    9319750 U1    3/1994
(Continued)

OTHER PUBLICATIONS

International Search Report dated Sep. 12, 2017 in corresponding application PCT/EP2017/063487.
(Continued)

*Primary Examiner* — Violeta A Prieto
(74) *Attorney, Agent, or Firm* — Muncy, Geissler, Olds & Lowe, P.C.

(57) ABSTRACT

A sensor system and a method for optical analysis of bulk material, having a sample space for receiving the bulk material that is to be examined, wherein a measurement section extending in the bulk material is realized in the sample space. In this case, means for changing the length of the measurement section are present. A harvester equipped, a laboratory or mobile system equipped with the system is also provided.

9 Claims, 6 Drawing Sheets

(52) U.S. Cl.
CPC ............... *G01N 2021/036* (2013.01); *G01N 2021/8592* (2013.01)

(56) References Cited

U.S. PATENT DOCUMENTS

| | | | |
|---|---|---|---|
| 4,692,620 A | 9/1987 | Rosenthal | |
| 5,092,819 A | 3/1992 | Schroeder et al. | |
| 5,616,923 A * | 4/1997 | Rich | G01N 21/0303 250/338.5 |
| 5,693,944 A * | 12/1997 | Rich | G01N 21/0303 250/343 |
| 6,100,526 A | 8/2000 | Mayes | |
| 7,369,226 B1 * | 5/2008 | Hewitt | G01N 21/0303 356/244 |
| 7,508,501 B2 | 3/2009 | Zubkov et al. | |
| 7,593,101 B2 * | 9/2009 | Yakimoski | G01N 21/0303 250/573 |
| 2004/0000592 A1 * | 1/2004 | Schwartz | G06K 7/10732 235/462.22 |
| 2005/0197532 A1 * | 9/2005 | Sasaki | A61B 1/0669 600/160 |
| 2007/0153282 A1 * | 7/2007 | Zubkov | G01N 21/85 356/436 |
| 2007/0297791 A1 * | 12/2007 | Fukasawa | G03B 9/24 396/506 |
| 2008/0252881 A1 * | 10/2008 | Yakimoski | G01N 21/05 356/246 |

FOREIGN PATENT DOCUMENTS

| | | |
|---|---|---|
| DE | 69826896 T2 | 11/2005 |
| DE | 102007029536 A1 | 1/2009 |
| DE | 102009017210 A1 | 10/2009 |
| EP | 1707945 A1 | 10/2006 |
| JP | S5610233 A | 2/1981 |

OTHER PUBLICATIONS

German Office Action dated Feb. 22, 2017 in corresponding application 102016110609.7.

* cited by examiner

SENSOR SYSTEM AND METHOD FOR THE PROCESS-INTEGRATED OPTICAL ANALYSIS OF BULK CARGO

This nonprovisional application is a continuation of International Application No. PCT/EP2017/063487, which was filed on Jun. 2, 2017, and which claims priority to German Patent Application No. 10 2016 110 609.7, which was filed in Germany on Jun. 8, 2016, and which are both herein incorporated by reference.

BACKGROUND OF THE INVENTION

Field of the Invention

The present invention relates to a sensor system and to a method for process-integrated optical analysis of bulk material, for example for optical analysis of cereals or the like. In this instance, the bulk material to be examined is received in a sample space, wherein a measurement section extending in the bulk material is realized in the sample space. Bulk material can be examined in this context in particular with respect to the moisture content thereof or the proportion of specific ingredients. One possible application for a sensor system of this type is the examination for example of grain samples for their residual moisture content or for the ingredients contained therein even during the threshing in the combine. In this case, particular importance is attached to the measurement section on which the optical examination of the bulk material is performed.

Description of the Background Art

The measurement section is understood to mean below the length portion on which measurement radiation used for the optical analysis passes through the bulk material. The optimum length of the measurement section is in particular also dependent here on the type of the bulk material that is to be examined. Of course, care is taken that, if the bulk materials to be examined have a granular structure, a plurality of grains are arranged along the measurement section in order to obtain a meaningful average of the measurement result. If it is desired to examine rape, for example, during threshing, it is possible that a shorter measurement section will suffice than would be necessary if peas or beans were to be examined.

To the top, the optimum measurement section is in particular also limited by the requirement that the layer thickness must not become so great that the measurement radiation, on its way through the bulk material to be examined, is attenuated to a degree such that no usable intensities still arrive at a receiver used for analysis.

SUMMARY OF THE INVENTION

It is therefore an object of the present invention to provide a sensor system which is able to be used flexibly for a wide variety of bulk materials.

The sensor system according to the invention for optical analysis of bulk material has a sample space for receiving the bulk material that is to be examined in each case. Realized within the sample space, for example between two passage windows for electromagnetic measurement radiation, is a measurement section that extends within the bulk material. According to the invention, an adjuster for changing the length of the measurement section is provided.

The adjuster may be used to adapt the measurement section to the bulk material that is to be analyzed in each case, for example to set relatively long measurement sections if beans are to be examined, and to set relatively short measurement sections if the bulk material to be examined is rape. As a result, the measurement section can be optimized such that meaningful averaging over a plurality of grains to be examined can be performed while transmitted, or trans-reflected, measurement radiation having an intensity that is still sufficient for analysis nevertheless arrives at a receiver.

Typical values for the length of the measurement section range from 3 mm-40 mm, in particular from 6 mm-25 mm.

In a first embodiment of the invention, the adjuster for changing the measurement section comprise at least one eccentric housing, arranged on an eccentric, having a passage window for measurement radiation. Upon rotation of the eccentric, the eccentric housing performs a movement which has one component along the measurement section. In other words, when rotating the eccentric, the measurement section is either lengthened or shortened. By using an eccentric it becomes relatively easy to convert a rotational movement into a movement with at least one translational component.

Additionally or alternatively, the adjuster for changing the measurement section can also comprise an element which is arranged on a sensor housing and can be used to move a passage window for measurement radiation in purely translational fashion, which likewise represents a simple option for setting the measurement section of interest in each case.

For example, an option herefor that is easy to implement is to embody the translationally movable element in the form of a displaceable cylinder that has a passage window for the measurement radiation at one end side thereof. Due to the fact that the cylinder is moved translationally, in particular axially, the end side having the passage window is displaced along the measurement section, and the length of the measurement section is set in this way.

A simple and integrated construction of the sensor system according to the invention is obtained in particular by arranging the translationally movable element, or the axially movable cylinder, in a U-shaped structure and by arranging the passage window to be opposite an inner side of one of the legs of the U-shaped structure. Upon an axial movement of the cylinder, the end side of the cylinder consequently moves for example toward the inner side of a leg of the U or away therefrom; if a further passage window for the measurement radiation or an element that is at least partially reflective for the measurement radiation is arranged at the inner side of said leg it is possible in this way to adapt the length of the measurement section relatively easily.

It is likewise conceivable that at least one strut is provided which is connected to the sensor housing and on which a holder is arranged; in this case, an entrance window for the measurement radiation or an element that at least partially reflects the measurement radiation is arranged on the holder; the result is, for example with a corresponding selection of the struts or of the holder, a multiplicity of possible configurations which are easy to realize and adapted in each case to the corresponding measurement situation.

Due to the fact that means for continuously or quasi-continuously feeding the bulk material that is to be examined to the sample space or for removing the bulk material from the sample space are present, an analysis of the bulk material that is to be examined can be performed practically in real time.

This variant is particularly advantageous if the sensor system is a system which is installed on a harvester. In connection with the easily available exact position data of the harvester, it is then possible on the basis in particular of the ingredients of the harvested crop or bulk material to make a statement relating for example to the soil quality within a determined region of a cultivation area. It is thus possible in subsequent vegetation phases for a customized, locally optimized application of mineral fertilizer or the like to be effected.

The harvester can be a combine harvester; in this case, the sample space can be arranged advantageously in the region between the threshing unit of the combine and a grain tank. The solution shown is however not only advantageous for use in harvesters, but also in applications where bulk material is conveyed and to be measured, for example at cereal delivery points, mills, food industry companies, etc. In particular, the sample space, which is provided with the stated device for feeding and removing the bulk material, can be embodied in the form of an independent unit—possibly although not necessarily provided with the sensor system that was described earlier. This unit can be employed in a laboratory or as mobile situated unit for example on areas of cultivation in agriculture. The bulk material can be bulk material of any type, such as plastics granulate or bulk materials that are employed in the chemical or pharmaceutical industry.

A method according to the invention for optical analysis of bulk material comprises, for example, the following steps: feeding bulk material to be examined into a sample space; guiding electromagnetic radiation through a measurement section of variable length, which extends in the bulk material that is situated in the sample space, during an individual measurement period, and evaluating the measurement radiation received by a receiver unit during the individual measurement period; and/or removing bulk material from the sample space.

The measurement section can be adapted in particular before recording a measurement to the bulk material to be measured—for example taking into account the grain size of the bulk material.

The possibility of feeding bulk material in targeted fashion to the sample space and thus the measurement section and of removing it from the sample space during or directly before or after the measurement step leads to extended possibilities with respect to the form of the measurement.

In particular, the feeding or removing of bulk material into or from the sample space can be controlled such that the bulk material rests in the region of the measurement section during an individual measurement period. In this way, the noise component of the measurement signal can be significantly reduced. The bulk material can be made to rest simply by not performing a removal of bulk material during the measurement; it is only to be ensured that bulk material is situated in the region of the measurement section. Further filling of the sample space above the measurement section then has no effect on the grains of the bulk material situated in the region of the measurement section. A certain averaging can then be effected by way of what is called a stop-flow measurement, in which several measurement cycles are performed in series with the bulk material resting. Typical values for the duration of an individual measurement cycle are in the region of less than 1 s; typically in the region of approximately 100 ms.

It is likewise conceivable that the feeding or removing of bulk material into or from the sample space can be controlled such that the bulk material is moving in the region of the measurement section during an individual measurement period. In this way, a certain averaging over time can already be performed during an individual measurement period. However, the noise component in the measurement signal increases due to the moving bulk material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
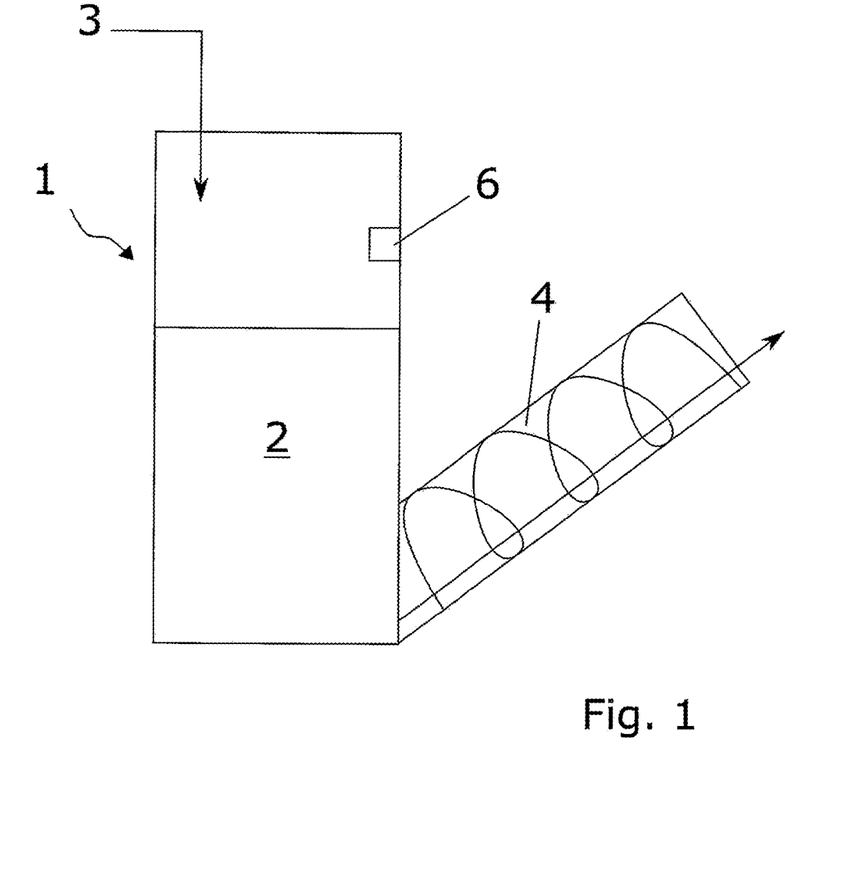
FIG. 1 schematically illustrates process components during the transport of bulk material.

FIG. 1 shows a schematic illustration of process components during the transport of bulk material across a measurement box 1, in an superordinate apparatus, in which the present invention can be realized. The sample space is here realized by the measurement box 1. The inflow of the bulk material into the measurement box 1 is here indicated by way of the arrow 3. The arrangement shown can be realized in a combine, in which case the bulk material 2 can be in particular threshed cereal, corn or beans. The bulk material 2 is in this instance transported from a threshing unit (not illustrated in the figure) into the measurement box 1 and is subsequently conveyed, using an auger 4, which is typically also referred to as an elevator, into a grain tank (not illustrated), as is indicated by the arrow 5.

Integrated in the measurement box 1 is a fill level sensor unit 6, which can read the height of the bulk material 2. The fill level sensor unit 6 is flange-mounted to the measurement box 1 as a component and for that reason can be removed, exchanged and serviced with little outlay. For a correct measurement function, a minimum height of the bulk material 2 in the measurement box 1 is necessary. This is ensured by a drive controller of the auger 4, which transports the bulk material 2 as desired into the grain tank. An empty measurement box 1 is necessary only for the calibration of the fill level sensor unit 6.

Figure 2A:
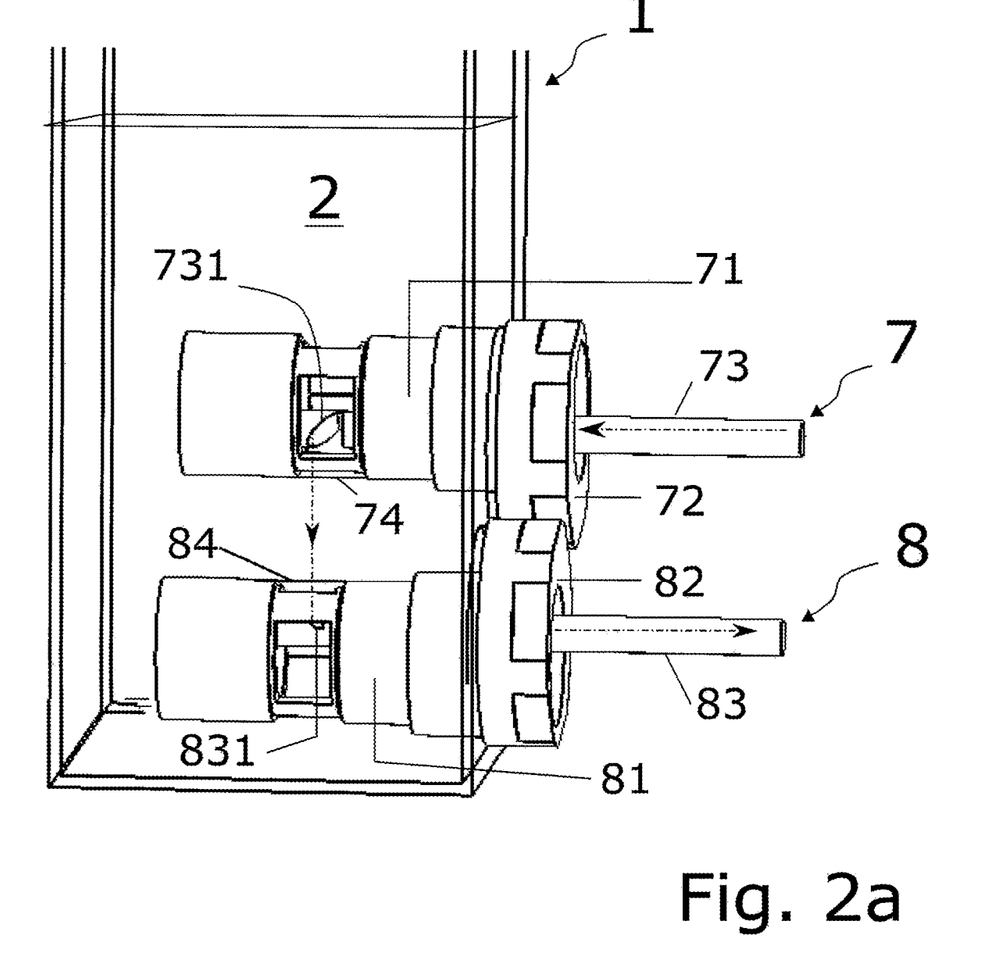
FIG. 2a shows a perspective view of an embodiment of the apparatus according to the invention in a first configuration.

FIG. 2a shows a perspective view of a first embodiment of the sensor system according to the invention in a first configuration. The sensor system here shows two exchangeable beam guidance units 7 and 8, which are flange-mounted to the measurement box 1 and can be used to perform an optical measurement of the bulk material by way of a settable layer thickness. A first deflection unit 73 and a second deflection unit 83 are fixed in their relative positions with respect to the measurement box 1 and each passes through a cut-out in the eccentric 72 and 82, respectively, arranged on which, to change the measurement section, are respective eccentric housings 71 and 81, which project into the measurement box 1. The eccentric housings 71 and 81 are provided here with an exit window 74 and respectively an entrance window 84, through which the measurement radiation can pass in each case during operation of the system. During measurement operation, measurement radiation is coupled in via the first deflection unit 73, is subsequently redirected at the first deflection mirror 731, passes through the exit window 74 and, after it has passed through the bulk material that is to be analyzed typically by way of transreflection, passes via the entrance window 84 and the deflection mirror 831 to a receiver (not illustrated in the figure) for further analysis. Via a rotation of one or both eccentrics 72 and 82, the distance between the two passage windows 74 and 84 can be set. The distance and the orientation of the two deflection units 73 and 83 remains unchanged in this case; however, the layer thickness of the bulk material 2 that is to be analyzed changes.

Figure 2B:
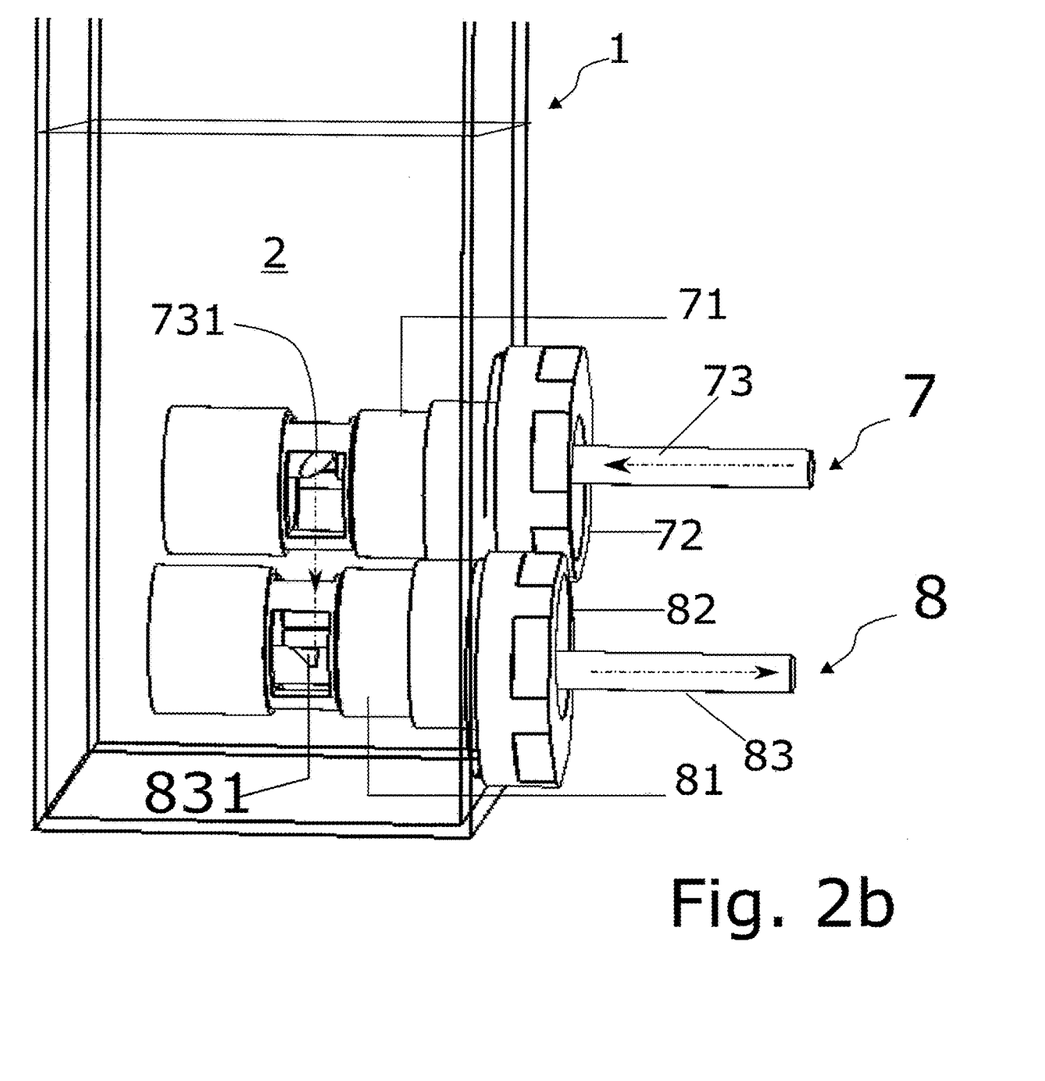
FIG. 2b shows a perspective view of the apparatus according to the invention in a second configuration.

FIG. 2b shows, likewise in a perspective view, the described embodiment of the invention in a changed rotational position of the eccentrics 72 and 82 with respect to one another. It is clear that, owing to the rotation of the eccentrics, the layer thickness and consequently the path length travelled by the beam through the bulk material 2 has decreased. The variation of the layer thickness is in particular advantageous in order to optimize the measurement for different types, sizes and structures of the bulk material 2.

Figure 3:
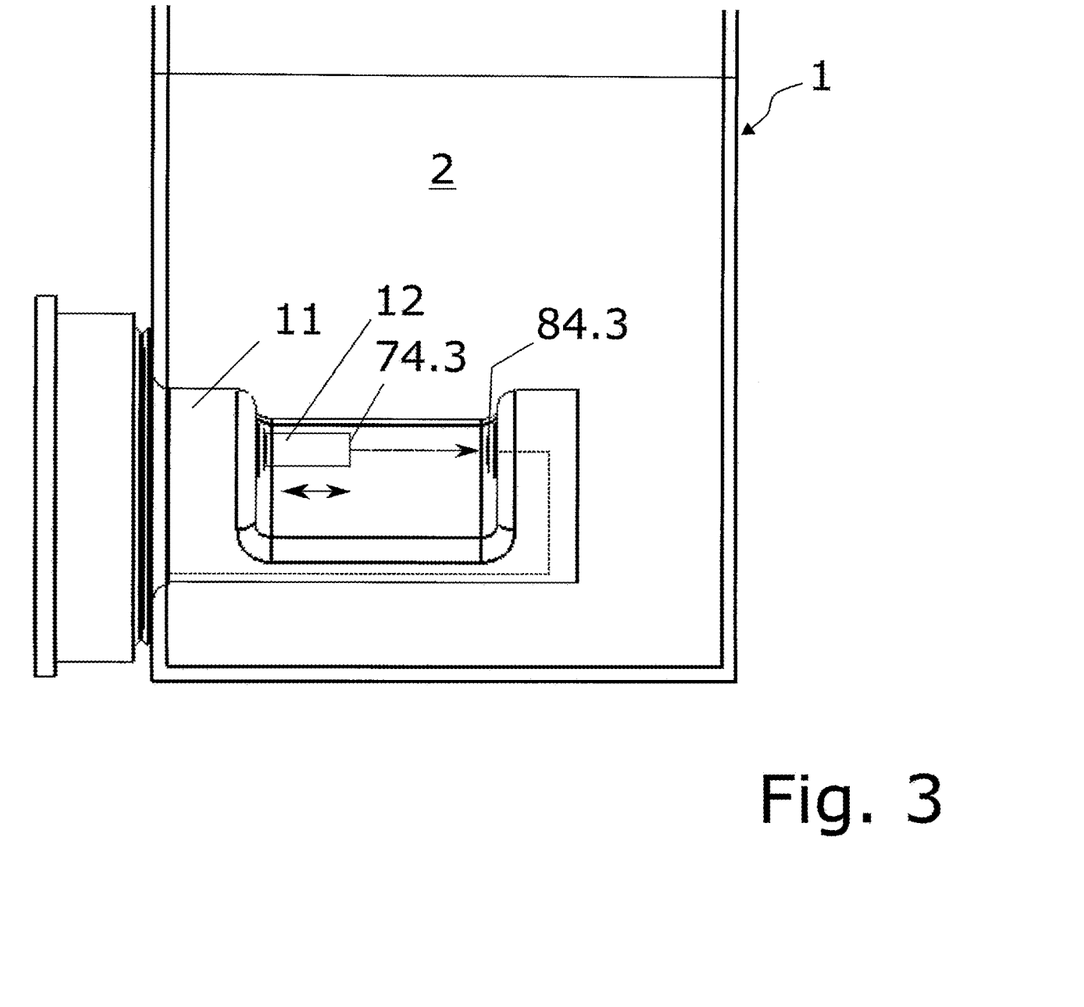
FIG. 3 shows a cross-section view of an embodiment of the apparatus according to the invention.

FIG. 3 shows an alternative embodiment of the invention. In the variant shown in FIG. 3, it is only necessary to attach a housing to the measurement box 1. The flange-mounted sensor housing is realized as a U-system housing 11. To change the measurement section, a displaceable cylinder 12 can be provided, in which the exit window 74.3 for the measurement radiation is arranged and via which the layer thickness can be set. The beam passes through the bulk material 2 and arrives, due to the U structure of the housing 11, at an opposite entrance window 84.3, from where it is guided through the U-structure out of the measurement box and to a receiver (not illustrated), as is indicated by the dashed beam path. An advantage of the shown "U" system is that the measurement radiation is guided completely in an apparatus which can be guided into the measurement box from one side, with the result that the complete sensor arrangement can be installed in one installation step for example in a vehicle. One advantage of the shown arrangement for transreflection measurements is that, for example, in the case of a reference measurement, the two windows which are in contact with the medium are also taken into account. Moreover, a transreflection measurement makes possible the use of silicon detectors which are available on the market in a wide variety of configurations.

Figure 4:
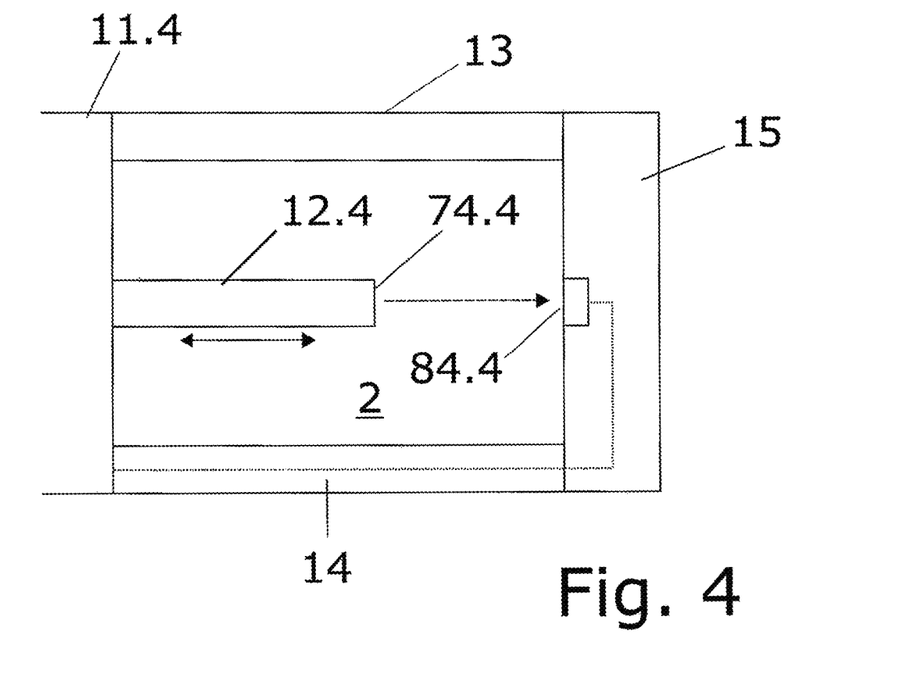
FIG. 4 shows in a cross-section view, an of the apparatus according to the invention.

FIG. 4 shows a third embodiment of the invention. The sensor system is depicted here also with a flange-mounted housing 11.4. The variable layer thickness can be set by way of the displaceable cylinder 12.4 in which the exit window 74.4 for the measurement radiation is arranged. Attached to the housing 11.4 are two struts 13 and 14, at which an entrance window 84.4 for the measurement radiation is arranged by way of a holder 15. The measurement radiation passes through the bulk material 2 and the entrance window 84.4 and arrives, through the strut 14 having a hollow design, at a receiver (not illustrated in the figure).

Figure 5:
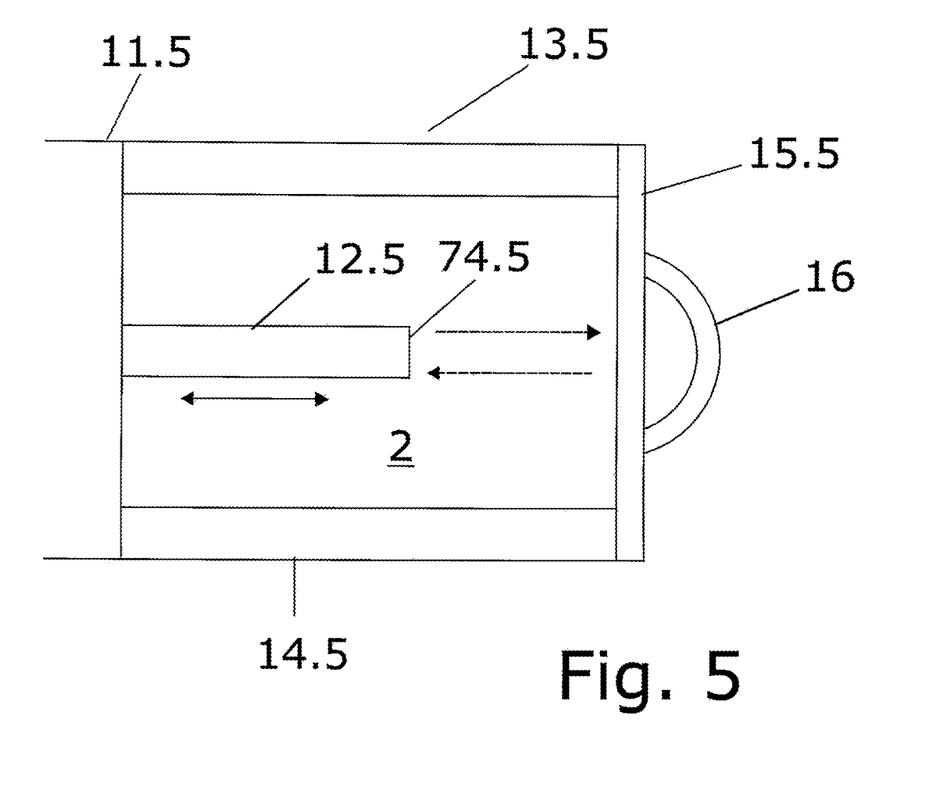
FIG. 5 shows in a cross-section view an embodiment of the apparatus according to the invention.

FIG. 5 shows a fourth embodiment of the invention. In contrast to the third variant, a transparent plate 15.5 is attached, as a holder, to the struts 13.5 and 14.5. Arranged thereon, opposite the passage window of the measurement radiation 74.5 on the displaceable cylinder 12.5, is a concave mirror 16. The measurement radiation is coupled out of the passage window 74.5, passes through the bulk material 2, and travels through the transparent plate 15.5 to arrive at the concave mirror 16, where it is reflected back. The measurement radiation consequently travels along the path through the bulk material 2 twice and arrives back at the passage window 74.5, from where it is guided to a receiver.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A sensor system for optical analysis of bulk material, the sensor system comprising:
    a sample space to receive the bulk material that is to be examined;
    a measurement section extending in the bulk material, the measurement section formed in part in the sample space, and wherein a length of the measurement section is adjustable; and
    an axially displaceable cylinder that is arranged on a sensor housing and that moves a passage window for measurement radiation in a purely translational motion, the movement of the passage window causing an adjustment of the length of the measurement section,
    wherein the passage window is provided at an end side of the axially displaceable cylinder for the measurement radiation, such that the measurement radiation passes through the axially displaceable cylinder and exits the axially displaceable cylinder via the passage window, and
    wherein the sensor housing is a U-shaped structure mounted to a side of the sample space such that the U-shaped structure extends inside of the sample space, the U-shaped structure having two legs and a base that connects the two legs, wherein the axially displaceable cylinder is arranged on an inner side of a first one of the two legs of the U-shaped structure, and wherein the passage window provided at the end side of the axially displaceable cylinder opposes an inner side of a second one of the two legs of the U-shaped structure.

2. The sensor system as claimed in claim 1, further comprising an entrance window for the measurement radiation or a mirror that at least partially reflects the measurement radiation, the entrance window or the mirror that at least partially reflects the measurement radiation being arranged on the inner side of the second one of the two legs of the U-shaped structure.

3. The sensor system as claimed in claim 1, further comprising a feeder for continuously or quasi-continuously feeding the bulk material that is to be examined to the sample space or for removing bulk material from the sample space are present.

4. A harvester having a sensor system as claimed in claim 1.

5. The harvester as claimed in claim 4, wherein the harvester is a combine harvester.

6. The harvester as claimed in claim 5, wherein the sample space is arranged in a region between a threshing unit and a grain tank of the combine.

7. A method for optical analysis of bulk material, the method comprising:
- feeding bulk material to be examined into a sample space;
- guiding electromagnetic radiation through a measurement section of variable length, which extends in the bulk material that is situated in the sample space, during an individual measurement period;
- evaluating the measurement radiation received by a receiver unit during the individual measurement period; and
- removing the bulk material from the sample space,
- wherein the measurement section is of variable length due to an axially displaceable cylinder arranged on a sensor housing, wherein a passage window is provided at an end side of the axially displaceable cylinder such that the axially displaceable cylinder causes translational motion of the passage window to adjust the length of the measurement section, and wherein the electromagnetic radiation passes through the axially displaceable cylinder and exits the axially displaceable cylinder via the passage window, and
- wherein the sensor housing is a U-shaped structure mounted to a side of the sample space such that the U-shaped structure extends inside of the sample space, the U-shaped structure having two legs and a base that connects the two legs, wherein the axially displaceable cylinder is arranged on an inner side of a first one of the two legs of the U-shaped structure, and wherein the passage window provided at the end side of the axially displaceable cylinder opposes an inner side of a second one of the two legs of the U-shaped structure.

8. The method as claimed in claim 7, wherein the feeding or removing of bulk material into or from the sample space is controlled such that the bulk material rests in the region of the measurement section during an individual measurement period.

9. The method as claimed in claim 7, wherein the feeding or removing of bulk material into or from the sample space is controlled such that the bulk material is moving in the region of the measurement section during an individual measurement period.

* * * * *